United States Patent
Makino et al.

(10) Patent No.: US 6,679,301 B2
(45) Date of Patent: Jan. 20, 2004

(54) POWDER PACKING METHOD AND APPARATUS THEREFOR

(75) Inventors: Kunio Makino, Shizuoka (JP); Hirosato Amano, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/095,268

(22) Filed: Mar. 11, 2002

(65) Prior Publication Data

US 2002/0144746 A1 Oct. 10, 2002

(30) Foreign Application Priority Data

Mar. 13, 2001 (JP) ........................................ 2001-071152
Mar. 30, 2001 (JP) ........................................ 2001-102264
Dec. 28, 2001 (JP) ........................................ 2001-398954

(51) Int. Cl.$^7$ .............................. B65B 1/26; B65B 1/16
(52) U.S. Cl. ............................... 141/67; 141/59; 141/71; 141/286; 222/189.1; 222/195; 399/258
(58) Field of Search ................................ 141/12, 67–71, 141/59, 286; 53/432, 510; 399/258, 261, 262; 222/195, 189.06, 189.08, 189.1

(56) References Cited

U.S. PATENT DOCUMENTS 2,234,788 A * 3/1941 Williams ...................... 141/91
2,780,247 A * 2/1957 Claassen, Jr. .................. 141/7
3,189,061 A   6/1965 Stockel et al.
3,258,041 A   6/1966 Lau
3,358,059 A * 12/1967 Snyder ......................... 264/51
3,499,577 A * 3/1970 Nilsson ......................... 222/1

FOREIGN PATENT DOCUMENTS

| DE | 1276539 | 8/1968 |
| DE | 1461796 | 3/1969 |
| EP | 1014214 | 6/2000 |
| JP | 07125701 | 5/1995 |
| JP | 9193902 | 7/1997 |
| JP | 09193902 | 7/1997 |

* cited by examiner

Primary Examiner—J. Casimer Jacyna
(74) Attorney, Agent, or Firm—Cooper & Dunham LLP

(57) ABSTRACT

A powder packing apparatus of the present invention is capable of sending a gas uniformly into powder to thereby fluidize the powder with a minimum amount of gas. The gas conveys the fluidized powder to the bottom of a container that may have a small mouth or a sophisticated configuration. The gas present in the powder introduced in the container is released via a powder layer between a nozzle and the mouth. The apparatus can therefore easily, densely pack the container with the powder without causing the powder to fly out of the container. Further, the apparatus is miniature, easy to carry and easy to operate and can therefore be handled by any person at any plate.

6 Claims, 5 Drawing Sheets

POWDER PACKING METHOD AND APPARATUS THEREFOR

BACKGROUND OF THE INVENTION

1. Field of the Invention

The present invention relates to a method of packing powder with a grain size as small as 20 µm or less in a container having a small mouth or a small volume or in a container unable to be packed with powder by gravity, and an apparatus therefore. More particularly, the present invention relates to a method of directly packing toner in a toner cartridge for an image forming apparatus or a developing unit included in the image forming apparatus, and an apparatus therefor.

2. Description of the Background Art

A rotary valve, a screw feeder and an auger, for example, belong to a family of members customarily used to pack a container with powder. After a container has been positioned beneath such a packing member, the packing member is operated to increase the bulk density of powder and delivers the powder into the container. This kind of packing scheme can efficiently pack the powder in the container having a preselected volume.

Japanese Patent Laid-Open Publication No. 9-193902, for example, discloses a powder packing method using a gas for fluidizing powder. Specifically, after the gas has been sent into the powder stored in a tank for fluidizing it, the powder is conveyed from the tank to the vicinity of a container via a conveying tube. A gas discharging tube releases the gas from the powder and then introduces the powder into the container.

The powder packing method taught in the above document has the following problems left unsolved. The conveying tube and gas discharging tube must be accurately coaxial with each other and are therefore difficult to assemble and make the entire assembly too heavy to carry. Moreover, the powder packing method is workable so long as the container has a large mouth diameter. However, if the container has a small mouth diameter or a sophisticated configuration, then the powder delivered from a packing apparatus to the container cannot be easily replaced with air inside the container. As a result, it is likely that the powder introduced into the container is blown out of the container via the mouth or obstructed by structural members, which may exist in the container.

The conventional powder packing methods have another problem when applied to a copier, printer or similar image forming apparatus using toner and situated at an ordinary office as one of OA (Office Automation) equipment. Specifically, when the toner is directly replenished to a toner bottle or a developing unit mounted on the image forming apparatus, the toner fly about in the office or, if successfully replenished, contains much air and is therefore low packing density.

SUMMARY OF THE INVENTION

It is an object of the present invention to provide a powder packing method capable of packing powder even in a container having a small mouth diameter or a sophisticated configuration, and an apparatus therefor.

It is another object of the present invention to provide a powder packing method capable of releasing air from powder packed in a container to thereby implement dense packing without any dust with a handy, easy-to-operated construction, and an apparatus therefor.

It is a further object of the present invention to provide a powder packing method allowing any one to pack a container with powder at any place without smear, and an apparatus therefor.

In accordance with the present invention, a method of packing a container with powder includes the steps of inserting a nozzle for introducing powder fluidized by a gas into a container into the container, and packing the container with the powder with the end of the nozzle being surrounded by powder present in the container.

Also, in accordance with the present invention, a powder packing apparatus includes a fluidizing device capable of being hermetically closed and formed with a gas inlet for receiving a gas for fluidization. A nozzle includes a hole for sending out the gas and is capable of hermetically closing the mouth of a container. A powder conveying path provides fluid communication between the fluidizing device and the nozzle. A first and a second filter are respectively positioned at the gas inlet of the fluidizing device and the hole of the nozzle, and each passes the gas, but filters out powder. The powder fluidized is confined between the fluidizing device and the container. The gas inlet of the fluidizing device has an area 1.002 times or more greater than the area of the hole of the nozzle for thereby causing the gas to flow at a higher rate through the hole than through the gas inlet. In this configuration, the powder is naturally introduced from the fluidizing device into the container via the powder conveying path and nozzle.

BRIEF DESCRIPTION OF THE DRAWINGS

The above and other objects, features and advantages of the present invention will more become apparent from the following detailed description taken with the accompanying drawings in which.

DESCRIPTION OF THE PREFERRED EMBODIMENTS

A system that fluidizes powder with a gas and pneumatically convey it via, e.g., a tube is conventional. This system, however, is problematic when toner or similar powder with a grain size as small as 20 µm or less, particularly 10 µm or less, is fluidized and packed in a toner container. In such a case, it is necessary to prevent the powder from flying about and to discharge a gas from the container after packing. While equipment for meeting such requirements may be additionally installed in a factory or similar large-scale facility, it is not practical in ordinary offices.

Toner or similar fine powder has an extremely great ratio of surface area to volume and, in many cases, coheres and is therefore loosened by, e.g., an agitator before use. The loosened powder mainly reflects only the surface condition of a mass, which is pulverized to produce the powder, without regard to the specific gravity of the mass and therefore continuously performs Brownian movement. It follows that when the fine powder is pneumatically conveyed, a prohibitive period of time is necessary for the powder to naturally sink and part from a gas mixed therewith, as known by experience.

Figure 1:
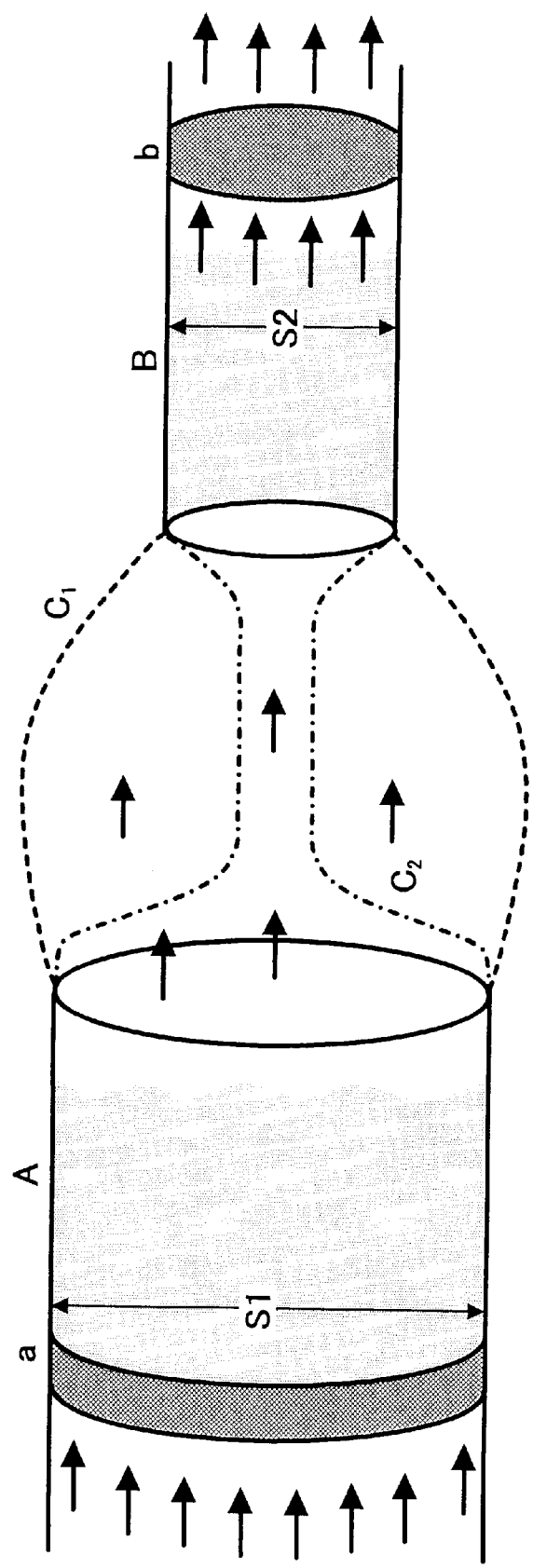
FIG. 1 is a view showing the principle of powder packing unique to the present invention.

Referring to FIG. 1 of the drawings, a powder packing system unique to the present invention is shown. As shown, the powder packing system includes a fluidizing device A, a filter a for separating powder and a gas, a container B, and a filter b for separating powder and a gas b. During packing, powder can exist only in the section between the filters a and b, i.e., it cannot flow out of the system via the filter a or b. It is to be noted that in accordance with the present invention the filter b is not mounted on the container B, but mounted on a nozzle.

As shown in FIG. 1, assume that the portion including the filter a has an opening area S1 while the portion including filter b has an opening area S2. Then, if the ratio of the opening area S1 to the opening area S2 is great, the gas can flow at a higher through the opening area S2 than through the opening area S1 in accordance with the above ratio. Therefore, even if the flow rate of the gas through the opening area S1 is low, a flow rate high enough to rapidly convey the fluidized powder to the container B is achievable. Today, there is an increasing demand for the small size, light weight configuration and yet high performance of OA equipment and therefore a toner or developer container with a small mouth diameter, i.e., opening area S2. In this respect, the high flow rate mentioned above is desirable.

Further, the rapid conveyance of the fluidized powder to the container B is achievable without regard to the diameter of a path communicating the fluidizing device A and container B. In FIG. 1, dotted lines indicate a sufficiently broad path C1 while dash-and-dot lines indicate a sufficiently narrow path C2.

Therefore, theoretically, so long as the opening area S1 is greater than the opening area S2, the gas for fluidizing the powder should only be sent to the filter a at a pressure slightly higher than the discharge pressure at the filter b, i.e., 1 atm. In practice, however, a head pressure loss is unavoidable because of the viscosity of the fluid in the system, friction acting between the fluid and the wall, decrease in the volume of the fluid, and so forth.

If the pressure of the gas for fluidizing the powder is excessively high, then powder clouds present in the container are apt to fail to capture the gas. Assume that a powder outlet path is implemented by a urethane tube not longer than 3.5 m. Then, the pressure should generally be 2 to 1,400 gauge $hPa/cm^2$, preferably 3 to 800 gauge $hPa/cm^2$ or more preferably 10 to 500 gauge $hPa/cm^2$, although it is dependent on the amount of powder clouds present in the container and powder packing conditions. Pressures below 2 gauge $hPa/cm^2$ extends the packing time.

In accordance with the present invention, the filters a and b deal with the same powder and can therefore be formed of the same material. The filters a and b may be implemented by, e.g., sintered metal sheets, metal meshes or sintered resin panels.

The prerequisite with the filters (porous sheets) a and b is that they uniformly pass air therethrough without being stopped up over long period of time and allow a gas to be sent at a relatively low pressure. Experiments showed that a sintered resin panel (Filteren (trade name) sheet available from Kaken) sandwiched between a hollow cylinder formed of acrylic resin and a bottom flange was most desirable. The following description will therefore concentrate on such sintered resin panels. It was found that the sintered resin panels allowed a gas to flow therethrough most uniformly, compared to Gore-Tex and sintered metal panels.

In accordance with the present invention, powder is fluidized by a gas sent into fluidizing means capable of being hermetically closed. At this instant, it is preferable to control the degree of introduction of the gas into the fluidizing means with a valve for thereby controlling pressure inside the fluidizing means. Also, it is preferable to send the gas uniformly into the fluidizing means with distributing means. The fluidized powder is then sent from the fluidizing means to a container. With this configuration, it is possible to send the gas into the fluidizing means at a controlled rate and therefore to fluidize the powder with a minimum necessary amount of gas, which reduces, e.g., the Brownian movement of the powder.

The fluidized powder can be easily delivered to the container only if pressure inside the fluidizing means is raised slightly above the atmospheric pressure. This insures smooth pneumatic delivery of the powder to the tip of a nozzle and therefore allows the container to be packed with the powder without any agitation thereinside.

Assume that an extra gas is sent into the fluidizing means in addition to the gas present in the fluidizing means. Then, to uniformly introduce the extra gas into the fluidizing means, use should preferably be made of gas distributing means, e.g., a metal mesh whose mesh size is small enough to obviate a critical head pressure loss. To start and end the packing operation, the pressure inside the fluidizing means is controlled. For this purpose, use may be made of a pressure release valve mounted on the fluidizing means. In addition, external pressing means may help the pressure release valve control the pressure. A flow control valve for fine pressure adjustment may be used to control pressure in the fluidizing means and/or a conveying path during packing operation. Further, pressure may be finely adjusted in such a manner as to vary the condition of powder delivery from the beginning of powder packing operation to the midst of the same.

The fluidizing means confining the powder and gas therein may be caused to vibrate to fluidize the powder and then pressurized. For the pressurization, pressure may be exerted on the fluidizing means from the outside to thereby reduce the volume of the fluidizing means. For example, the fluidizing means may be squeezed to deliver the powder to the nozzle. This makes a fluidizing device needless or at least makes it small size and omits delivering means as far as possible. The fluidizing means may have a size and weight small enough to be shaken by and or a size and weight easy to vibrate when acted on by an air pump. The fluidizing means may even be provided with a disposable, handy configuration if a necessary amount of powder is stored therein beforehand.

Figure 2:
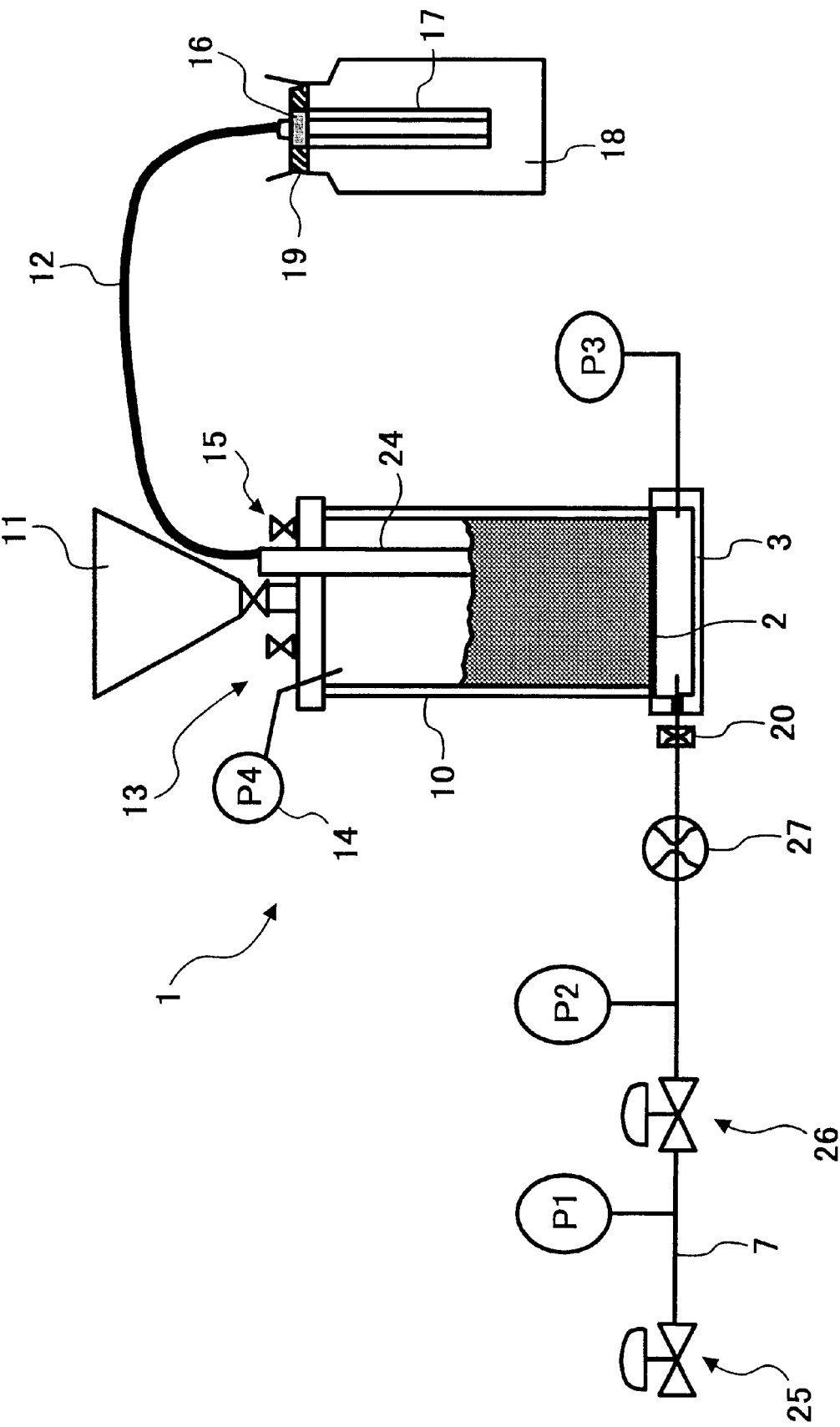
FIG. 2 is a view showing a powder packing apparatus embodying the present invention.

Reference will be made to FIG. 2 for describing a preferred embodiment of the powder packing apparatus in accordance with the present invention. As shown, the powder packing apparatus, generally 1, includes a fluidizing device 10 that is usually hermetically closed. A filter or porous sheet 2 removably mounted on the bottom of the fluidizing device 10 via a flange for forming a fluidized powder layer. The filter 2 is implemented as a sintered metal sheet, a sintered resin sheet or a fine mesh by way of example. A piping 7 with a control valve 20 allows compressed air to flow therethrough. The piping 7 is removably received in an air header or air introducing means 3 at one end thereof. A hopper 11 with a valve, not shown, allows desired powder to be introduced therein. A valve 13 is operated to release or confine pressure in the fluidizing device 10. A flow rate control valve 15 is operated to finely control the flow rate of the powder. A pressure gauge 14

(fourth pressure gauge P4) is responsive to pressure inside of the fluidizing device 10.

A powder outlet tube 24 extends out from the fluidizing device 10. A polyethylene tube or similar conveying tube 12 is connected to the powder outlet tube 24 at one end thereof. A nozzle 17 is removably connected to the other end of the conveying tube 12. A filter 16 is fitted on the end of the nozzle 17 adjoining the conveying tube 12. A soft packing 19 surrounds the filter 16 and is implemented as a polypropylene ring. The packing 19 is so sized as to fit on the mouth of a container 18.

The air header 3 is resistive to some pressure such that pressure inside the fluidizing device 10 can be elevated. In this sense, the air header 3 is a pressure container. A third pressure gauge P3 is connected to the air header 3. A first reducing valve 25, a second reducing valve 26 and a flow meter 27 are mounted on the piping 7 in this order, as named in the direction of air flow. A first pressure gauge P2 intervenes between the reducing valves 25 and 26 while a second pressure gauge P2 intervenes between the reducing valve 26 and the flow meter 27. The container 28 may advantageously be implemented as a transparent toner container formed of resin.

In operation, desired powder is introduced into the fluidizing device 10 via the hopper 11. At this instant, the valve 13 is left open. The flow control valve 15 may be operated either manually or automatically, e.g., via a solenoid-operated valve not shown. Subsequently, after the valve 13 has been closed, compressed air is sent into the air header via the piping 7. The first and second reducing valves 25 and 26 may be adjusted to control the pressure of the compressed air. The compressed air is continuously sent so long as the packing apparatus is in operation.

Compressed air is uniformly scattered into the powder via the filter 2 and fluidizes the powder. The end of the nozzle 17, which is connected to the conveying tube 12, is tilted or partly protruded so as not to contact the bottom of the container 18. After the end of the nozzle 17 has been inserted into the container 18, the valve 13 is closed. As a result, compressed air inside the fluidizing device 10 forces the powder out of the device 10 into the conveying pipe 12. The powder conveyed by compressed air via the conveying tube 12 flows into the container 18 via the nozzle 17.

If the container 18 is fully empty at the beginning of the packing operation, then it may be packed with the powder by the following specific procedure. Initially, the flow rate control valve 15 is restricted so as to deliver the powder from the fluidizing device 10 at a low rate, thereby controlling the behavior of the powder in the container 18. As soon as the powder in the container 18 rises to such a level that it substantially surrounds the fluidized powder being discharged via the nozzle 17, the flow control valve 15 is fully opened.

The nozzle 17 may be inserted into the container 18 either manually or automatically after the container 18 has been set at a preselected position.

After the container 18 has been packed with the powder, the nozzle 13 is opened to lower the pressure inside the fluidizing device 10 to zero. As a result, the delivery of the powder from the fluidizing device 10 to the container 18 ends.

If desired, to rapidly raise the pressure inside the fluidizing device 10, the fluidizing device 10 may be provided with an additional inlet port for compressed air, which is independent of the air header 3, at a position above the level of the powder present in the device. The nozzle 17 may be replaced with a simple pipe. In the illustrative embodiment, the nozzle 17 has a double wall structure made up of an inner wall and an outer wall. Part of the outer wall is constitute by a metal screen as fine as 3,000 mesh or above or a sintered plastic sheet. Pressure between the inner wall and the outer wall is reduced by an air injection effect. As a result, air inside the powder packed in the container 18 is released to thereby further increase the packing density.

Modifications of the illustrative embodiment described above also apply to an embodiment to be described with reference to FIG. 4 later.

Figure 3:
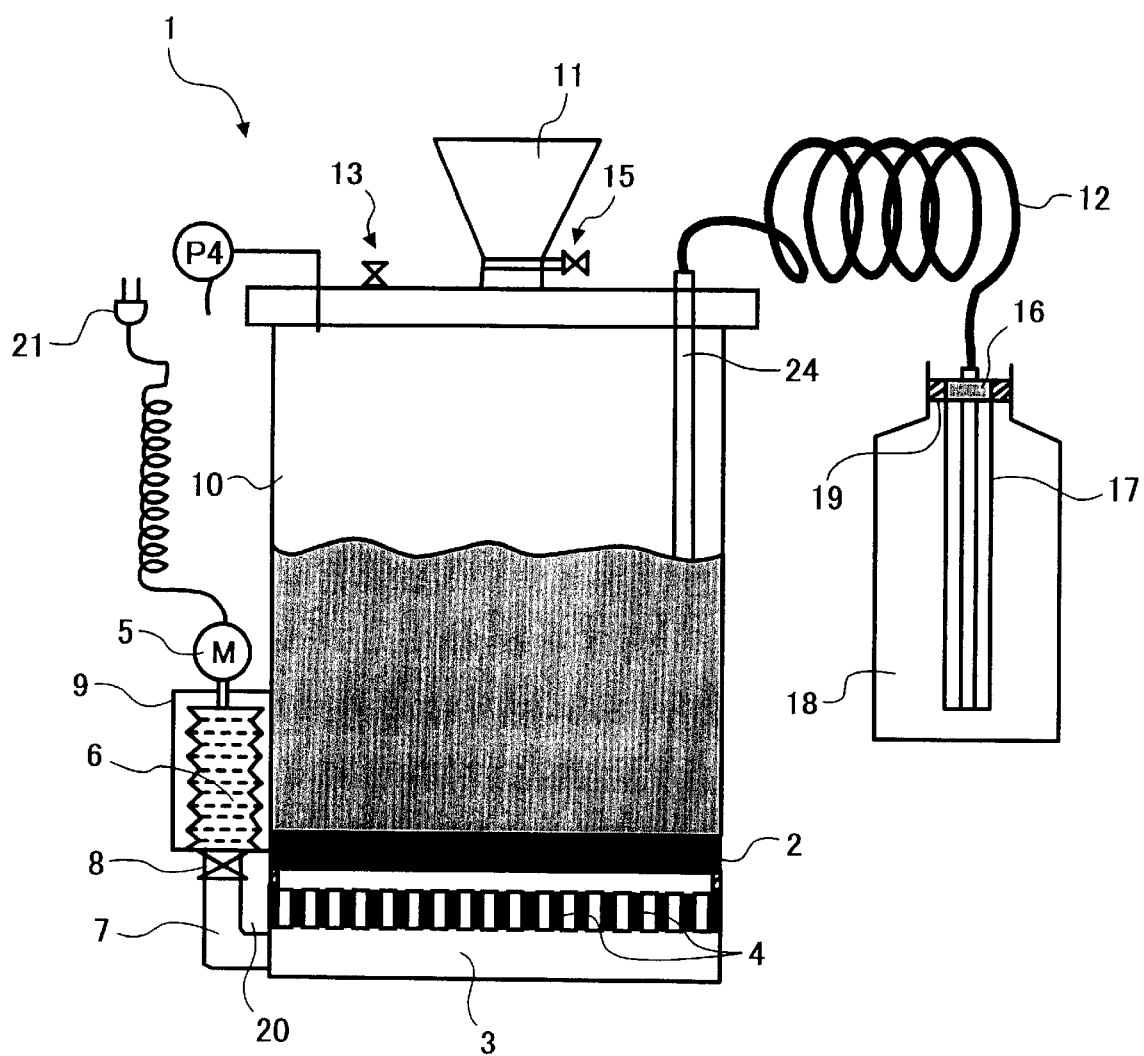
FIG. 3 is a view showing an alternative embodiment of the present invention.

FIG. 3 shows an alternative embodiment of the present invention. As shown, the powder packaging apparatus 10 is generally identical in configuration with the packaging apparatus described with reference to FIG. 3. In the figures, identical structural elements are designated by identical reference numerals and will not be described in order to avoid redundancy. The following description will concentrate on differences between the illustrative embodiment and the previous embodiment.

In the illustrative embodiment, the fluidizing device 10 is formed of soft plastics or similar flexible material. The powder outlet pipe 24 is formed of stainless steel or similar metal. The nozzle 17 is formed of stainless steel.

The illustrative embodiment includes a pump 6 implemented as bellows and removably received in a frame 9. A check valve 8 is disposed in the outlet port of the pump 6. A miniature motor 5 causes the pump or bellows 6 to expand and contrast for feeding-compressed air to the air header 3. When the motor 5 causes the pump 6 to expand and contact, the fluidizing device 10 bodily vibrates with the result that air inside the device 10 fluidizes the powder. In FIG. 3, the reference numeral 4 designates an air distributor.

In the illustrative embodiment, neither the fluidizing device 10 nor the air header 3 does have to be provided with a thick wall customary with a pressure container. The entire powder packing apparatus 1 is therefore light weight and small size. The powder packing device 1 can start operating only if a plug 21 attached to the motor 21 is inserted in an outlet provided on, e.g., a copier.

In any one of the foregoing embodiments, the container 18 may be formed of polyethylene or similar soft plastics, which is easy to deform by hand, and implemented as a hermetic container formed with a single opening for piping. In this case, a urethane tube or similar tube is connected to the above single opening. The container 18 is compressed from the outside to raise its internal pressure, so that the powder flows toward the bottom of the container 18 via the tube.

Alternatively, the container 18 may be formed of, e.g., hard plastics, which does not deform, and formed with at least two openings. In this case, air under the pressure of 0.2 mPa or below is sent into the container 18 via one opening. The powder is conveyed to the bottom of the container 18 by a tube connected to the other opening. To supply air under pressure, use may be made of, e.g., a compressor or even a bicycle pump.

In the illustrative embodiments, the filter or air outlet opening 2 has an area selected to be 1.002 times or more greater than the area of the filter or air outlet opening 16. This causes compressed air to flow through the filter 16 at a higher rate than it flows through the filter 2. The fluidized powder can therefore flow from the fluidizing device 10 to the container 18 as if it were naturally introduced into the container 18. The illustrative embodiments are particularly effective when the powder has a bulk mean grain size ranging from 0.2 $\mu$m to 20 $\mu$m.

Another alternative embodiment of the present invention will be described with reference to FIG. 4. This embodiment is also similar to the embodiment shown in FIG. 2 except for the following. In the figures, identical structural elements are designated by identical reference numerals and will not be described specifically in order to avoid redundancy. The following description will concentrate on differences between the illustrative embodiment and the embodiment of FIG. 2.

Figure 4:
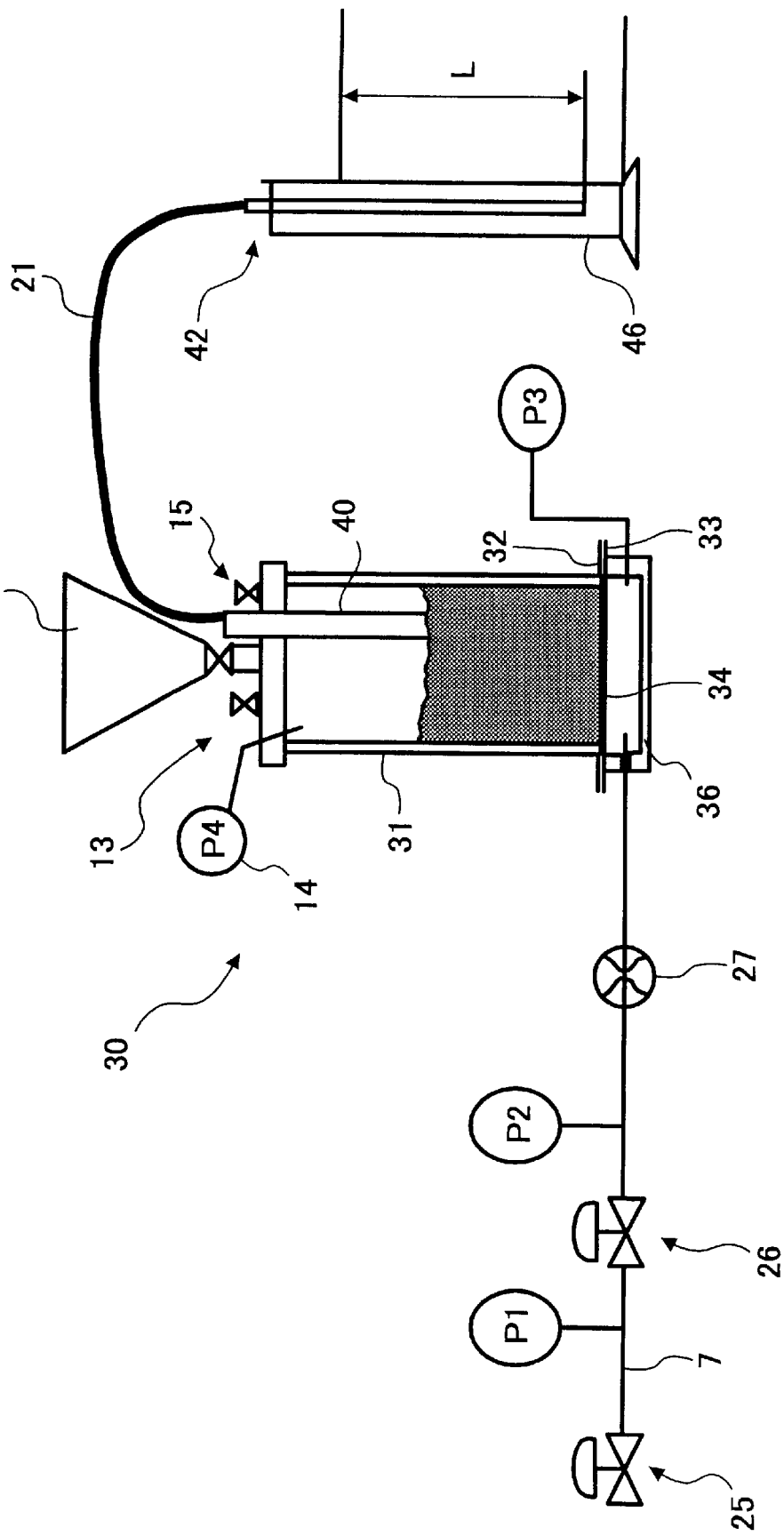
FIG. 4 is a view showing another alternative embodiment of the present invention.

As shown in FIG. 4, a powder packing apparatus, generally 30, includes a fluidizing device 31 including a lower flange 32. An upper flange 33 is fitted on a filter or porous sheet 34 corresponding to the filter 2, FIG. 2. The filter 34 is implemented as a sintered metal sheet, a sintered resin sheet or a screen of fine mesh by way of example. The upper flange 33 is removably connected to the lower flange 32. An air header or air introducing means 36 removably accommodates the filter 34. A powder outlet pipe 40 extends out from the fluidizing device 31 and is formed of stainless steel. A nozzle 42 formed of stainless steel is removably connected to the conveying tube 12. The air header 36 is identical in configuration with the air header 3, FIG. 2. In the illustrative embodiment, the control valve 20, FIG. 2, is absent.

In the illustrative embodiment a container 46 to be packed with the powder is implemented as a 500 ml messcylinder for a measurement purpose. In practice, the container 46 is, of course, be implemented as a container formed of resin or any other suitable material.

The operation of the powder packing device 30 is identical with the operation of the powder packing device 1, FIG. 2, and will not be described specifically in order to avoid redundancy.

Figure 5:
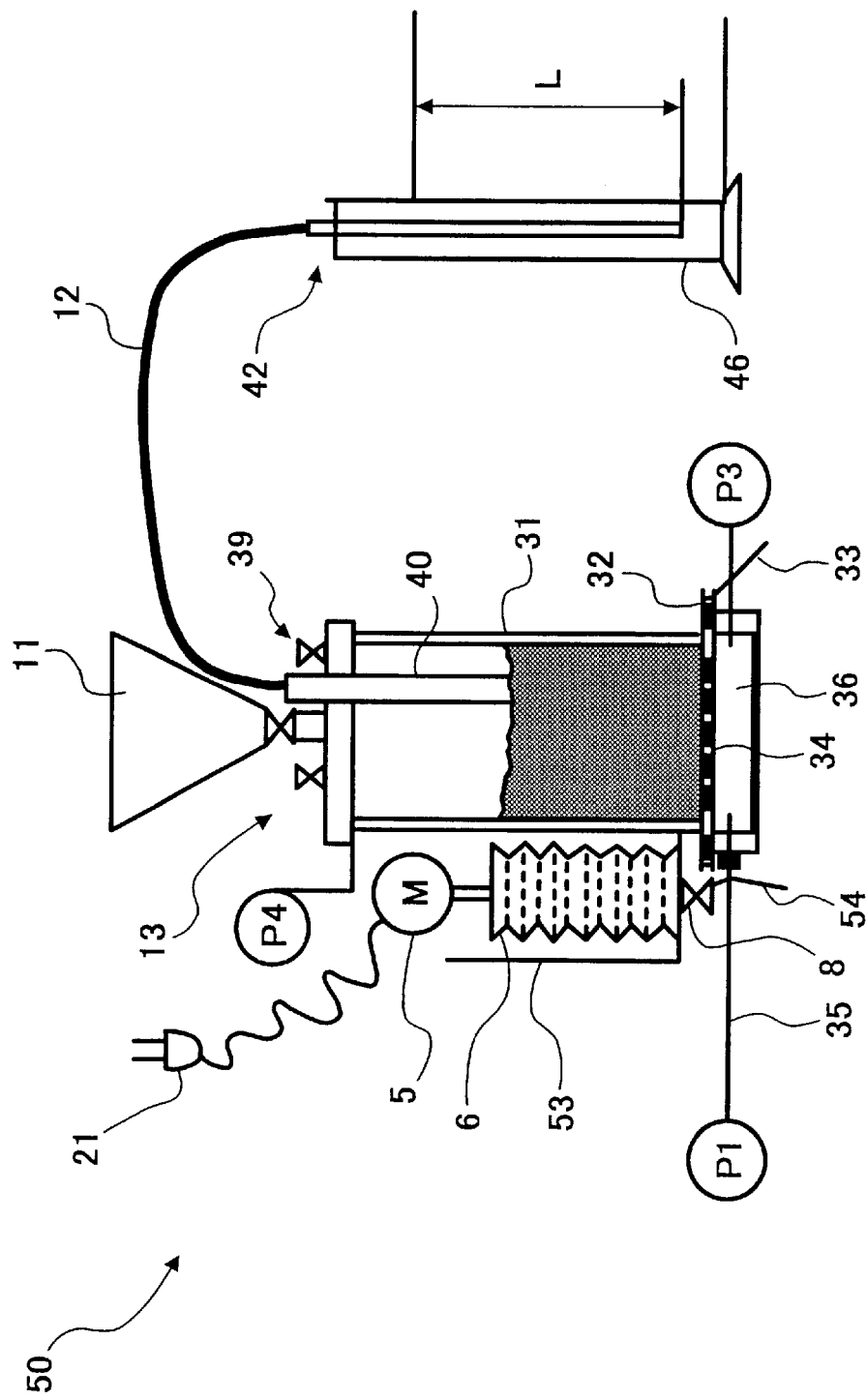
FIG. 5 is a view showing a further alternative embodiment of the present invention.

FIG. 5 shows a further embodiment of the present invention. As shown, a powder packing apparatus, generally, 50 includes the fluidizing device 31 identical with the fluidizing device of FIG. 4 and the bellows type pump 6 identical with the pump 6 of FIG. 3. Members associated with the fluidizing device 31 and members associated with the bellows type pump 6 are designated by identical reference numerals and will not be described specifically in order to avoid redundancy. The operation of the powder packing device 50 will be readily understood by analogy.

A specific example of the powder packing device 30, FIG. 4, will be described hereinafter. The fluidizing device 31 was implemented as a hollow cylinder having a diameter of 200 mm and a height of 500 mm and formed of acrylic resin. An upper flange and a lower flange were respectively mounted on the top and the bottom of the cylinder and fastened to the cylinder by bolts. The filter 34 mounted on the bottom of the cylinder was made up of a sintered resin panel (Filteren) and sandwiched between the cylinder and the lower flange. The sintered resin panel was superior to Gore-Tex or sintered metal panel as to the uniform flow of compressed air. This was proved by positioning the sintered resin panel between two flanges and passing compressed air therethrough to see bubbles to appear in water, which was present on the upper flange.

While any gas other than air is usable, the specific example used dry air having a dew point of −10° C. in an oil-free state. Such air is sent into the space below the sintered resin panel under reduced pressure. The flow meter 27 (Flow Cell (trade name)) was used to send air at a rate of 2 l for a minute. For powder, use was made of color toner applicable to a copier and having a center grain size of 6.8 μm, a true specific gravity of 1.2, and a tapping volume specific gravity of 0.48.

The hopper 11 with a valve was mounted on the flange mounted on the top of the cylinder; the flange was formed of stainless steel. The pressure control valve 15, which was a manual valve, was also mounted on the above flange.

The powder outlet pipe 40 and nozzle 42 both were formed of stainless steel. The conveying tube 12 was formed of urethane and had an inside diameter of 6 mm. For the container 46, use was made of a transparent, 500 ml messcylinder for observing and measuring the behavior of the powder. Assuming that the height of the bottom of the messcylinder was zero, the bottom of the nozzle 42 was positioned 0.01 mm to 255 mm above the bottom of the messcylinder.

Compressed air was sent at pressures of 10 kPa and 20 kPa. Two kinds of nozzles 42, one having an inside diameter of 3 mm and the other having an inside diameter of 6 mm, were prepared. The messcylinder was packed with the powder by 500 cc (upper limit). This allowed apparent specific gravity to be calculated on the basis of the packed weight after the removal of the nozzle 42.

To measure dust particles flying about, a dust meter Digital Dust Indicator P-5 (trade name) available from Shibata Science Technology was used. Before packing operation, the dust meter counted fourteen dust particles for a minute.

Compressed air was continuously sent to the air header 36 via the piping 7. When the pressure control valve 15 was closed by hand, pressure inside the fluidizing device 31 was lowered. As a result, the powder is delivered from the fluidizing device 31 to the messcylinder 46 via the route shown in FIG. 4.

When the dust meter was positioned at the same level as the mouth of the messcylinder 46, it counted 308 dust particles for a minute. By contrast, when the dust meter was positioned 30 mm above the bottom of the messcylinder 46, it counted only fourteen dust particles as before the packing operation.

Bulk specific gravity after packing was dependent on the position of the nozzle 42. Specifically, the powder had a tapping specific gravity of 0.48. The mouth of the messcylinder 46 had a diameter of 50 mm. In these conditions, the height of the nozzle 42 above the bottom of the messcylinder 46 was varied between 0 mm and 255 mm. Bulk specific gravity was 0.29 when the height of the nozzle 42 was 0 mm or 0.43 when it was 255 mm. This shows that great bulk specific gravity is achievable when the nozzle 42 is buried in the powder.

Hereinafter will be described another specific example of the powder packing device 30 shown in FIG. 4. The fluidizing device 31 had a capacity of 200 l. Toner was stored in the fluidizing device 31 in an amount of 60 kg to 70 kg. Generally, toner should preferably be stored in the fluidizing device 31 in an amount of 40 kg to 90 kg. The fluidizing device 31 was modified such that its top lid could be easily opened to see the inside of the device 31. The filter or porous plate 34 was formed of resin and 5 mm thick. The filter 34 had a pore diameter of 2 μm to 10 μm and a pore ratio of 30%. The valve 13 was controlled such that compressed air was sent from a compressed air source to the air header 36 at a rate of 30 l for a minute via the reducing valves 25 and 26, settling the upper surface of toner clouds in the fluidizing device 31.

Subsequently, the valve 39 was opened. Pressure inside the fluidizing device 31 was raised to 20 kPa so as to deliver the toner from the fluidizing device 31 to the nozzle 42 via the conveying tube 12. The nozzle 42 had an inside diameter of 5 mm, which was smaller than the inside diameter of an ordinary nozzle for high-density packing. Generally, the inside of the nozzle 42 should preferably be between 3 mm and 20 mm. The pressure for delivery inside the fluidizing device 31 should preferably be between 5 kPa and 35 kPa. Excessively high pressure would cause the toner to fly about and fail to form clouds. Excessively low pressure would bring about pulsation and would thereby obstruct stable delivery.

In this specific example, a suction tube, not shown, was inserted from the hopper 37 into the fluidizing device 31 so as to suck air out of the device 31. A metal mesh capable of filtering out toner covered the end of the suction tube.

Experiments showed that the pressure loss of the powder packing apparatus 30 should preferably be 0.45 kPa or above. Pressure losses below 0.45 kPa failed to uniformly fluidize the toner. Further, the upper limit of the pressure loss corresponded to the lower limit of the diameter of the powder outlet pipe 40 and that of the nozzle 42; the pipe 40 and nozzle 42 were stopped up when their diameters were extremely small.

Compressed air should preferably flow into the toner in the fluidizing device 31 as uniformly as possible via the air header 36. In this respect, discharging air from a position adjoining the side face of the filter 34 was not desirable. The toner had a density of 0.2 g/cc to 0.3 g/cc when it was desirably fluidized and formed desirable clouds.

Moreover, the powder packing apparatus 30 successfully prevented an antistatic agent, an anti-cohesion agent, a fluidity preserving agent and other agents from coming off the surfaces of the individual toner grains. The toner was therefore protected from deterioration. This is contrastive to an auger or similar mechanical agitator that brings about stresses on toner.

In summary, in accordance with the present invention, a powder packing apparatus is capable of sending a gas uniformly into powder to thereby fluidize the powder with a minimum amount of gas. The gas conveys the fluidized powder to the bottom of a container that may have a small mouth or a sophisticated configuration. The gas present in the powder introduced in the container is released via a powder layer between a nozzle and the mouth. The apparatus can therefore easily, densely pack the container with the powder without causing the powder to fly out of the container. Further, the apparatus is miniature, easy to carry and easy to operate and can therefore be handled by any person at any plate.

Various modifications will become possible for those skilled in the art after receiving the teachings of the present disclosure without departing from the scope thereof.

What is claimed is:

1. A powder packing apparatus comprising:

fluidizing means capable of being hermetically closed and formed with a gas inlet for receiving a gas for fluidization;

a nozzle including a hole for sending out the gas and capable of hermetically closing a mouth of a container;

a powder conveying path providing fluid communication between said fluidizing means and said nozzle; and a first and a second filter respectively positioned at said gas inlet of said fluidizing means and said hole of said nozzle, and each passing the gas, but filtering out powder, wherein the powder fluidized is confined between said fluidizing means and said container, said gas inlet of said fluidizing means has an area 1.002 times or more greater than an area of said hole of said nozzle for thereby causing the gas to flow at a higher rate through said hole than through said gas inlet, the powder is naturally introduced from said fluidizing means into the container via said powder conveying path and said nozzle, after the gas sent into said fluidizing means has fluidized the powder in said fluidizing means, said powder is delivered from said fluidizing means to said nozzle, and a pressure inside said fluidizing means is raised to deliver the powder from said fluidizing means to said nozzle.

2. A powder packing apparatus comprising:

fluidizing means capable of being hermetically closed and formed with a gas inlet for receiving a gas for fluidization;

a nozzle including a hole for sending out the gas and capable of hermetically closing a mouth of a container;

a powder conveying path providing fluid communication between said fluidizing means and said nozzle; and a first and a second filter respectively positioned at said gas inlet of said fluidizing means and said hole of said nozzle, and each passing the gas, but filtering out powder, wherein the powder fluidized is confined between said fluidizing means and said container, said gas inlet of said fluidizing means has an area 1.002 times or more greater than an area of said hole of said nozzle for thereby causing the gas to flow at a higher rate through said hole than through said gas inlet, the powder is naturally introduced from said fluidizing means into the container via said powder conveying path and said nozzle, after the gas sent into said fluidizing means has fluidized the powder in said fluidizing means, said powder is delivered from said fluidizing means to said nozzle, and said fluidizing means comprises:

a first valve for controlling a flow rate of the gas to be sent into said fluidizing means; and a second valve for controlling a flow rate of the powder to be delivered from said fluidizing means;

wherein at least one of said first valve and said second valve is controlled to an amount and a degree of delivery of the powder from said fluidizing means to said nozzle.

3. The apparatus as claimed in claim 2, wherein said fluidizing means further comprises a third valve fully openable to release the pressure for thereby immediately ending a delivery of the powder.

4. The apparatus as claimed in claim 3, wherein said fluidizing means further comprises gas introducing means implemented as a pressure container for storing the gas to be introduced into said fluidizing means.

5. The A powder packing apparatus comprising:

fluidizing means capable of being hermetically closed and formed with a gas inlet for receiving a gas for fluidization;

a nozzle including a hole for sending out the gas and capable of hermetically closing a mouth of a container;

a powder conveying path providing fluid communication between said fluidizing means and said nozzle; and a first and a second filter respectively positioned at said gas inlet of said fluidizing means and said hole of said nozzle, and each passing the gas, but filtering out powder, wherein the powder fluidized is confined between said fluidizing means and said container, said gas inlet of said fluidizing means has an area 1.002 times or more greater than an area of said hole of said nozzle for thereby causing the gas to flow at a higher rate through said hole than through said gas inlet, the powder is naturally introduced from said fluidizing means into the container via said powder conveying path and said nozzle, after the gas sent into said fluidizing means has fluidized the powder in said fluidizing means, said powder is delivered from said fluidizing means to said nozzle, and the powder comprises toner for developing a latent image and having a volume mean grain size between 0.2 $\mu$m and 20 $\mu$m.

6. A powder packing apparatus comprising:

a nozzle inserted into a container to a position where at least an end of said nozzle is surrounded by a powder present in said container;

gas introducing means for introducing a gas for fluidizing the powder; and a conveying path for conveying the powder fluidized to said nozzle, wherein said nozzle, said gas introducing means and said conveying path are attached to fluidizing means capable of being hermetically closed, and a safety valve is included in said fluidizing means for selectively releasing or confining a pressure in said fluidizing means.

* * * * *